3,271,379
PROCESS FOR PREPARING OPTICALLY
ACTIVE POLYMERS
Giulio Natta, Milan, and Piero Pino and Gian Paolo Lorenzi, Pisa, Italy, assignors to Montecatini Società Generale per l'Industria Mineraria e Chimica, Milan, Italy
No Drawing. Filed May 8, 1961, Ser. No. 126,739
Claims priority, application Italy, May 13, 1960, 8,544/60
15 Claims. (Cl. 260—93.7)

An object of the present invention is the providing of a process for preparing polymers possessing optical activity in solution.

Polymers having optical activity in solution, more particularly polymers of alpha-olefins, and two methods for preparing these polymers have been disclosed in U.S. Serial No. 2,607 filed on January 15, 1960, now U.S. Patent No. 3,193,544.

The first method comprises polymerizing an optically-active alpha-olefin having the formula:

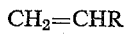

wherein R is an aliphatic radical containing 4 to 8 carbon atoms at least one of which is asymmetric, or an alkylaryl group in which the alkyl component contains at least one asymmetric carbon atom, in the presence of catalysts containing transition metal compounds of the 4th, 5th or 6th group of the Periodic Table according to Mendeleef and organometallic compounds of elements belonging to the 1st, 2nd or 3rd group of the same table.

The second method comprises polymerizing optically inactive alpha-olefins in the presence of catalysts of the same type as that used in the above mentioned first method, but prepared from optically active organometallic compounds.

It has now been found that optically active polymers can be obtained from optically inactive polymers by a process which comprises separating the two optical antipodes by selective adsorption on crystalline polymers in the presence of a solvent for the optically inactive polymer in which solvent, however, the crystalline polymer used as the adsorbing mass is insoluble. The adsorption step is then followed by a fractionation with solvents.

In the case of racemic mixtures of poly-alpha-olefins, an optically active crystalline poly-alpha-olefin having the formula:

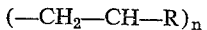

wherein R is a branched alkyl group containing 4 to 8 carbon atoms at least one of which is asymmetric, or an alkylaryl group in which the alkyl group contains at least one asymmetric carbon atom, which poly-alpha-olefin is insoluble in a solvent for the racemic mixtures of poly-alpha-olefins, is used as the adsorbent.

As the adsorbent for the selective adsorption there is used in particular high melting point, optically active, crystalline polymers of the aliphatic series, which polymers have branched side groups containing asymmetrical carbon atoms, preferably in a position alpha or beta with respect to the main chain. These polymers must be insoluble or less soluble in the solvents used for the fractionation than the polymer to be separated.

These polymers suitable for use as the adsorbent, can be prepared for example, by the methods described in the aforementioned in the foregoing U.S. Patent No. 193,544.

More particularly it has been found advantageous to employ the crystalline (+)-poly-(S)-3-methyl-1-pentene obtained as a residue from the crude polymer (prepared with the aid of stereospecific catalyst) after a prolonged and practically complete extarction with benzene at the boiling point of the solvent. This residue is very slightly soluble in all hydrocarbon solvents, esters and alcohols at temperatures lower than 200° C.

Another example of such an optically active crystalline polymer suitable for use as the adsorbent in the process of the present invention, is (+)-poly-(S)-4-methyl-1-hexene which is obtained as a residue after an ether extraction.

Some examples of solvents or eluants which are suitable for use in the process of the present invention, are ethers, e.g., ethyl ether, propyl ether, etc.; esters, e.g., ethyl acetate; low boiling point hydrocarbons, e.g., n-pentane; or ketones, e.g., acetone, methylethyl ketone, etc.

The process of the present invention for preparing optically active poly-alpha-olefins from optically inactive poly-alpha-olefins by separating the two optical antipodes by selective adsorption on optically active poly-olefins, followed by solvent fractionation, can be carried out in various ways.

According to one embodiment of the invention, the process can be carried out in a chromatographic column containing the finely pulverized optically active crystalline polymer, e.g., (+)-poly-(S)-3-methyl-1-penene suspended in a solvent for the optically inactive polymer, such as an ether. Through this column is percolated a solution of an optically inactive polymer (e.g., optically inactive poly-4-methyl-1-hexene) obtained by polymerization of the optically inactive monomer using sterospecific catalyst: in the same solvent used for preparing the suspension of the crystalline polymer adsorbent already present in the column. The adsorbent is then eluted with this same solvent. Fractions having a negative optical activity are initially obtained; while the optically positive fractions are so strongly adsorbed on the adsorbent that they are not eluted with ethers or iso-octane. These optically positive fractions can be separated from the adsorbent by the use of better solvents and/or operating at higher temperatures, e.g., by extraction with hot benzene.

According to another embodiment of the present invention, the optically active crystalline polymer adsorbent is suspended in a solution of optically inactive polymer. The suspension is agitated for a long time, while heating if desired, and a solid phase consisting of the optically active crystalline polymer, insoluble in the solvent used, and of the adsorbed portion of the polymer to be separated in the two optical antipodes, is separated from the liquid phase and subjected to fractionation. In the event that the polymer to be fractionated has a solubility not very different from that of the adsorbent polymer it may be convenient to precipitate (by addition of a non-solvent or by cooling) both polymer fractions together and then fractionate the mixture by warm extraction with suitable solvents.

The general process of the present invention can be used for preparing optically active polymers from optically inactive polymers, such as poly-4-methyl-1-hexene, poly-3--phenyl-1-pentene, poly - 5-methyl - 1-heptene, poly-4-methyl-1-heptene, poly-6 - methyl-octene, poly - 3,4-dimethyl-1-pentene, poly-3-methyl-1-pentene, poly-3-methyl-1-hexene.

Conventional fractionation techniques for separating soluble substances by selective adsorption can be used in the process of the present invention. It is to be noted that a novel feature of the invention is the use of an optically active polymeric substance instead of the common optically inactive adsorbing agent.

The process described in the present invention in practice can be of particular interest in all cases in which the crystalline structure of the optically active polymer appears to be different from that of the optically inactive polymer. It is known that most isotactic polymers crystallize as a structure which allows the presence of alternate dextro-rotatory and levorotatory chains.

In the crystals consisting of chains spiralized only in one direction, can be present different crystalline lattices and the polymers in the solid state can therefore have different physical properties.

The optically active highly crystalline polymers obtained by the process according to the invention are particularly suitable for the production of self-supporting films and all-purpose textile fibres having a very high mechanical strength. They can also be used in general as adsorbing agents for the separation of racemic substances into optical antipodes.

The present invention will be better illustrated by the following examples which should by no means be considered as limitative.

Example 1

2.60 g. of finely pulverized poly-(S)-3-methyl-1-pentene, obtained as the residue after benzene extraction in a Kumagawa extractor, are introduced, in the form of a suspension in anhydrous ether, into a burette having an inner diameter of 0.9 cm., which is closed with a cotton butt near the cock.

The poly-(S)-3-methyl-1-pentene which is used, melts at 271–273° C. and has a specific rotation ($[\alpha]_D^{20°}$) of about $+194°$.

The height of the resulting chromatographic column is 18 cm. By percolating through this column a solution of 0.5 g. of optically inactive poly-4-methyl-1-hexene (insoluble in acetone) in 6.5 cc. of anhydrous ethyl ether and then eluting with ethyl ether while under a nitrogen atmosphere, the fractions reported in Table 1 are obtained. The polymer content is determined by removing the solvent under vacuum.

TABLE 1.—CHROMATOGRAPHY OF 0.5 G. OF AN OPTICALLY INACTIVE POLY-4-METHYL-1-HEXANE FRACTION, SOLUBLE IN ETHYL ETHER AND INSOLUBLE IN ACETONE, ON A CHROMATOGRAPHIC COLUMN OF POLY-(S)-3-METHYL - 1 - PENTENE, USING ETHYL ETHER AS THE ELUANT

| Fraction N°. | Polymer, g. | Rotation Angles determined in Benzene at Room Temperature, $\alpha_D$ | Concentration, g./100 cc. | $[\alpha]_D$ |
| --- | --- | --- | --- | --- |
| 1 | | | | |
| 2(a) | 0.247 | $-0.12°\ (l=2)$ | 1.83 | $-3.3°$ |
| 3–4 | 0.088 | $-0.03°\ (l=2)$ | 0.65 | $-2.3°$ |
| 5–18 | 0.0760 | | 0.09 | |
| 19(b) | 0.035 | $+0.18°\ (l=1)$ | 0.35 | $+51.5°$ | a = The first two fractions were obtained by elution with 10 cc. of ethy ether for each fraction. All the other fractions were eluted with 5 cc. o ether for each fraction.
b Fraction obtained by warm extraction with benzene.

In order to obtain the 19th fraction, which contains the polymer having positive optical activity, it was necessary to transfer the mass present in the burette into a thimble filter and continue the extraction with warm benzene in a Kumagawa extractor. The residue obtained by evaporating the ether from the 18th fraction appears to be imponderable. The determination of the optical activities was always carried out in a benzene solution at room temperature.

Example 2

0.51 g. of optically inactive poly-4-methyl-1-hexene, insoluble in acetone and partially soluble in ethyl ethyl ether, are dissolved in 200 cc. of warm anhydrous benzene in a flask provided with an agitator.

To this solution are then added 5.6 g. of finely pulverized poly-(S)-3-methyl-1-pentene having the same characteristics as the polymer adsorbent used in Example 1. The suspension obtained is heated while under nitrogen to the boiling point of the solvent for two hours while maintaining agitation.

After this treatment, the mixture is cooled and filtered. The filtrate, which has a polymer concentration of 0.05 g./100 cc. shows no noticeable optical rotation in a 2-dm. polarimetric tube.

The filtration residue is subjected to extraction in a Kumagawa extractor. By using ethyl ether as the solvent, there is obtained two fractions containing a polymer having negative optical activity as shown in the following Table 2. There is reported the observed rotation angles, measured at room temperature, and the specific rotatory power of the polymer present in each of the two fractions.

TABLE 2

| Fraction N°. | Weight, g. | Rotation Angles Determined in Decahydronaphthalene $\alpha_D\ (l=1)$ | Concentration, g./100 cc. | $[\alpha]_D$ |
| --- | --- | --- | --- | --- |
| 1 | 0.128 | $-0.145°$ | 1.83 | $-7.9°$ |
| 2 | 0.022 | $-0.015°$ | 0.31 | $-4.8°$ |

The polymer possessing positive optical activity remains strongly adsorbed on the adsorbent and must be removed from the latter by repeated washing with decahydronaphthalene at its boiling temperature.

By this treatment it is possible to obtain a fraction containing 0.017 g. of a polymer having a high positive optical activity. This polymer fraction has, in a decahydronaphthalene solution, the following characteristics:

$$[\alpha]_D = +94°;\ \alpha_D(l=2) = +0.21°$$

Concentration = 0.111 g./100 cc.

Example 3

0.47 g. of optically inactive poly-4-methyl-1-hexene, soluble in ethyl ether and insoluble in acetone, are added as a highly concentrated ethyl ether solution to 4.1 g. of poly-(S)-3-methyl-1-pentene placed in a thimble of a 500-cc. Kumagawa extractor.

The poly-(S)-3-methyl-1-pentene employed has the same specific rotatory power, $[\alpha]_D^{20} = +194$ and the same melting point, 271°–273° C., as the polymer used in Examples 1 and 2 but differs from the latter since, before its use, it has been subjected to an extraction with boiling decahydronaphthalene.

The fractionation of the optically inactive polymer is carried out by warm extraction with ethyl ether and then with benzene and interrupting the extraction at intervals of time in order to remove the whole solution obtained and to introduce further solvent.

The first four polymer fractions reported in Table 3 were collected by stopping the ether extraction after having discharged 4 times the basket containing the thimble filter (the capacity of the basket was of about 120 cc.); the benzene fraction on the contrary was obtained by prolonging the extraction for a time corresponding to at least 20 discharges.

In the decahydronaphthalene used as last solvent in the warm extraction in the Kumagawa extractor, no polymer was found. The data obtained are reported in Table 3.

0.202 g. of the first fraction obtained was subjected to a further fractionation by chromatography in a column.

The column used, having an inner diameter of 0.75 cm., contains 1.28 g. of poly-(S)-3-methyl-1-pentene, residue from the extraction with decahydronaphthalene, and 0.74 g. of a support consisting of potassium chloride, finely pulverized and intimately mixed with the polymer. The height of the chromatographic column is 17.5 cm.

Poly-4-methyl-1-hexene is introduced as a solution in 3.4 cc. of anhydrous ethyl ether and the solution is left to percolate. It is then eluted with ether and then with benzene, obtaining the results reported in Table 4.

TABLE 3.—FRACTIONATION OF OPTICALLY INACTIVE POLY-4-METHYL-1-HEXENE BY WARM EXTRACTION IN A KUMAGAWA IN THE PRESENCE OF POLY-S-3-METHYL-1-PENTENE.

| Fraction N°. | Solvent used for the fractionation | g. | $\alpha_D$ in benzene [a] | concentration, g./100 cc. | $[\alpha]_D$ |
|---|---|---|---|---|---|
| 1 | Ethyl ether | 0.245 | −0.12° (l=1) | 3.03 | −3.9° |
| 2 | ----do---- | 0.099 | −0.07° (l=1) | 1.23 | −5.7° |
| 3 | ----do---- | N.d. | N.d. | N.d. | N.d. |
| 4 | ----do---- | 0.040 | +0.04° (l=1) | 0.50 | +8.0° |
| 5 | Benzene | 0.028 | +0.17° (l=2) | 0.11 | +77 |
| 6 | Decaline | | | | |

[a] The rotation angles were measured at room temperature.

TABLE 4.—FRACTIONATION OF 0.202 G. OF POLY-4-METHYL-1-HEXENE HAVING $[\alpha]_D = -3.9°$ BY CHROMATOGRAPHY ON POLY-(S)-3-METHYL-1-PENTENE SUPPORTED ON KCl.

| Fraction N°. | g. | $\alpha_D^1$ | Concentration, g./100 cc. | $[\alpha]_D$ |
|---|---|---|---|---|
| 1² | | | | |
| 2² | 0.149 | −0.13° (l=1) | 2.37 | −5.5° |
| 3² | 0.032 | −0.03° (l=0.5) | 0.84 | −7.1° |
| 4² | 0.010 | −0.03° (l=1) | 0.36 | −8.4° |
| 5-20² | 0.006 | | | |
| 21³ | 0.001 | | | |
| 22⁴ | 0.007 | +0.05 (l=1)) | 0.25 | +20° |
| 23⁴ | | | | |

[1] The rotation angles were measured at room temperature. Ether solutions were used for fractions 1 and 2 while for the other fractions benzene solutions were employed.
[2] Fraction obtained by elution with ethyl ether at room temperature.
[3] Fraction obtained by elution with benzene at room temperature.
[4] Fraction obtained by elution with benzene at the boiling temperature.

Many variations and other embodiments can of course be practiced without departing from the scope of the present invention.

Having thus described the present invention, what it is desired to secure by Letters Patent is:

1. A process for preparing a polymer having optical activity in solution, from an optically inactive polymer capable of being separated into the optically active antipodes, characterized in that an optically inactive poly (alpha-olefin) having the formula $CH_2=CHR$ wherein the R group contains at least one carbon atom which is asymmetric, dissolved in a solvent, is subjected to a selective adsorption using an optically active crystalline polyhydrocarbon adsorbent and two polymer fractions having opposite optical activity are recovered.

2. A process according to claim 1, characterized in that said optically inactive polymer is made up of two optically active fractions which are successively separated from the optically active crystalline adsorbent by contacting said adsorbent with a solvent.

3. A process according to claim 1, characterized in that the optically inactive polymer, dissolved in a solvent, is subjected to a chromatographic separation in a column containing an adsorbent comprising an optically active crystalline polyhydrocarbon.

4. A process according to claim 3, characterized in that two polymer fractions having opposite optical activity are successively recovered by fractional elution of the adsorbent.

5. A process according to claim 3, characterized in that one of the two optically active fractions is recovered by fractional elution and the second fraction, having an opposite optical activity, is recovered by contacting the adsorbent with a warm solvent.

6. A process according to claim 1, which is carried out in a continuous manner.

7. A process according to claim 1, characterized in that the adsorbent comprises an optically active crystalline polyhydrocarbon which is less soluble than the optically inactive polymer in the solvents used in the process.

8. A process according to claim 7, wherein the adsorbent is insoluble in the solvents used in the process.

9. A process according to claim 1, characterized in that the adsorbent comprises (+)-poly-(S)-3-methyl-1-pentene.

10. A process according to claim 1, characterized in that the adsorbent comprises (+)-poly-(S)-4-methyl-1-hexene.

11. A process according to claim 1, characterized in that the optically inactive poly-alpha-olefin is poly-4-methyl-1-hexene.

12. A process according to claim 1, characterized in that the optically inactive poly-alpha-olefin is poly-3-phenyl-1-pentene.

13. A process according to claim 1, characterized in that the optically inactive poly-alpha-olefin is poly-5-methyl-1-heptene.

14. The process according to claim 1, wherein said optically inactive polymer is an optically inactive polymer of an alpha-olefin having the formula:

$$CH_2=CHR$$

wherein R is selected from the group consisting of branched aliphatic radicals containing from 4 to 8 carbon atoms at least one of which is an asymmetric carbon atom and alkylaryl radicals in which the alkyl portion contains from 4 to 8 carbon atoms at least one of which is an asymmetric carbon atom.

15. The process according to claim 1, wherein said optically active crystalline polyhydrocarbon adsorbent is an optically active polymer of an alpha-olefin of the formula:

$$CH_2=CHR$$

wherein R is selected from the group consisting of branched aliphatic radicals containing from 4 to 8 carbon atoms at least one of which is an asymmetric carbon atom and alkylaryl radicals in which the alkyl portion contains from 4 to 8 carbon atoms at least one of which is an asymmeric carbon atom.

References Cited by the Examiner

Stereospecific Catalysis and Stereoregular Addition Polymers a collection of the original papers by Prof. Giulio Natta and coworkers, vol. III, Paper No. 88, 6 pages.

JOSEPH L. SCHOFER, *Primary Examiner*.

M. B. KURTZMAN, *Assistant Examiner*.